United States Patent [19]

Eichbauer et al.

[11] Patent Number: 4,518,654

[45] Date of Patent: May 21, 1985

[54] ONE-SIDED CLING STRETCH WRAP

[75] Inventors: George N. Eichbauer, Fairport; Beth A. LeBlanc, Rochester, both of N.Y.

[73] Assignee: Mobil Oil Corporation, New York, N.Y.

[21] Appl. No.: 564,664

[22] Filed: Dec. 23, 1983

[51] Int. Cl.³ .................. B32B 27/06; B32B 27/32
[52] U.S. Cl. .............................. 428/331; 428/516; 428/520; 428/519; 428/913; 428/689; 264/176 R; 53/441; 53/211; 53/556; 53/587
[58] Field of Search ............. 428/331, 516, 913, 520, 428/519

[56] References Cited

U.S. PATENT DOCUMENTS 4,418,114  11/1983  Briggs et al. ............... 428/516 X
4,436,788   3/1984  Cooper ....................... 428/516 X

FOREIGN PATENT DOCUMENTS 12971  2/1978  Japan ............................ 428/516

Primary Examiner—Patricia C. Ives
Attorney, Agent, or Firm—Alexander J. McKillop; Michael G. Gilman; James P. O'Sullivan, Sr.

[57] ABSTRACT

A stretch wrap film having one sided cling comprising a thermoplastic A/B film structure wherein layer A in stretched condition has a comparatively high cling force to layer B and layer B has at least substantially no cling force to a layer of itself.

10 Claims, No Drawings

ONE-SIDED CLING STRETCH WRAP

The present invention is concerned with a stretch wrap film and, in particular, with a stretch wrap film suitable for spin wrapping applications wherein the film has a high degree of cling on one side thereof.

The use of thermoplastic stretch wrap for the overwrap packaging of goods, and in particular, the unitizing of pallet loads, is a currently commercially developing end use application for thermoplastic films including, generically, polyethylene. There are a variety of overwrapping techniques which are employed utilizing such stretch wrap films, including locating the pallet load to be wrapped atop a rotating platform. As the stretch wrap film is laid on about the girth of the pallet load, the pallet load is rotated on its platform. The stretch wrap is applied from a continuous roll thereof. Braking tension is applied to the continuous roll of film so that the film is being continuously stretched by the rotating pallet load. Usually the stretch wrap film, located adjacent to the rotating pallet load, is vertically positioned and the rotating platform or turntable may be operated at speeds ranging from about 5 up to about 50 revolutions per minute. At the completion of the overwrap operation, the turntable is stopped completely while the film is cut and attached to the previous layer of film by employing tack sealing, adhesive tape, spray adhesives, etc. Depending upon the width of the stretch wrap roll, the load being overlapped may be shrouded in the film while the vertically positioned film roll remains fixed in a vertical position, or the vertically positioned film roll (for example in the case of relatively narrow film widths and relatively wider pallet loads) may be arranged to move in a vertical direction as the load is being overwrapped whereby a spiral wrapping effect is achieved on the package goods.

It is known in the art to include cling additives in order to impart an increased cling force between two contacting films. For example, household cling wrap film, used to cover dishes containing leftover food must have the ability to cling to smooth surfaces made of glass, ceramic, and plastic. Examples of such cling wrap film are described in U.S. Pat. Nos. 4,348,455 and 4,367,256 the disclosures of which are in their entirety incorporated herein by reference. In both of these teachings the cling wrap additive (alkali metal dialkyl sulfosuccinate in one case, and glycerol oleates in the other case) are incorporated uniformly throughout the film so that the cling force on one side of the film is substantially the same as that of the other side of the film. The incorporation of such cling agents in a stretch wrap film employed for the unitizing of pallet loads presents a serious and expensive problem. While the employment of such a cling modified stretch wrap film will enhance and strengthen the bonding of the overlap film after the load has been stabilized there is the tendency of one stabilized load to cling or drag against an adjacent load causing transportation and handling problems. Because of the cling nature of the overwrap, one such overwrapped pallet load will not slide against an adjacent load. The tendency is for one load to pull destructively upon an adjacent load because of the clinging nature of the film. Pallet loads are moved about by fork lift trucks and the forces involved can and do pull through the stretch wrap film and destroy the integrity of the overwrap load.

It is an object to overcome this problem in an effective and economical manner.

SUMMARY OF THE INVENTION

In accordance with the present invention, a stretch wrap film having one sided cling comprises a thermoplastic A/B film structure wherein layer A, in its stretched condition, has a comparatively high cling force to layer B and layer B has at least substantially no cling force to a layer of itself. The base polymer of layer A comprises a thermoplastic polymer which in film form does not possess a substantial cling force to a layer of itself. This layer is modified by the uniform dispersion therein of a cling additive in an amount sufficient to maintain film A in its stretched condition, in cling contact with layer B. Layer B contains an anticling additive of a character and in an amount sufficient to prevent at least any substantial cling force to a layer of itself. These films are preferably coextruded together so that inspite of the cling and anticling character of the individual films, the coextrusion at elevated temperature creates a bond at the interface thereof sufficiently strong such that during ordinary use the integrity of the interface is maintained. It is preferred that the film be transparent so that pallet wrapped loads will reveal the identity of the stabilized goods for inventory confirmation purposes. By "transparent" is meant, the film does not obscure the identity of the wrapped items. This does not exclude a colored, tinted or opaque film. Other films or layers of specific function may be interposed between the A/B layers.

DETAILED DESCRIPTION OF THE INVENTION

Any thermoplastic film capable of being fashioned into a stretch wrap film is contemplated for use herein. This film can be modified by the inclusion therein of prior art cling additives for one side of the stretch wrap film and any known anticling additives can be added to the same material. Alternatively, a different thermoplastic material can be employed for the noncling side of the film. While the noncling side of the film is of a character not to cling to itself or to any other noncling type surface there must be an effective cling between the cling type film of the present invention and the noncling film.

The pallet unitizing techniques described in U.S. Pat. Nos. 3,986,611 and 4,050,221 are contemplated herein. The disclosures of these patents are incorporated herein in their entirety by reference. Particularly preferred thermoplastic films suitable for use in the present invention are the polyolefins such as polyethylene, polypropylene, copolymers of ethylene and propylene, and polymers obtained from ethylene or propylene copolymerized with relatively minor amounts of other mono olefinic monomers such as butene-1, isobutylene, acrylic acids, esters of acrylic acids, vinyl acetate, styrene and the like or combinations thereof. Preferred for the subject film is, generically polyethylene, including, high and low molecular weight polyethylene and copolymers thereof. Particularly preferred for the cling film portion of the coextruded stretch wrap film of the present invention is linear low density polyethylene (LLDPE). This material actually is a copolymer of ethylene with a $C_4$–$C_{10}$ olefin, for example, butene-1, 1,3-methyl-butene-1, 1,3-methyl-pentene-1, hexene-1, 4-methylpentene-1, 3-methyl-hexene-1; octene-1, decene-1, etc. The alpha-olefin is usually present in from 1–10 weight percent of the copolymer. A typical manufacturing process for the formation thereof is disclosed in U.S. Pat. Nos. 4,076,698 and 4,205,021 the disclosures of which are in their entirety incorporated herein by reference. The preferred LLDPE has a density ranging from about 0.905 to about 0.940 gm/c.c. This material preferably has a melt index of from about 1 to about 6. This material will constitute the A layer of the subject coextruded A/B structure.

Similarly, while any thermoplastic noncling film can be employed as the B layer of the A-B film structure, it is preferred that this layer also be a polyolefin. The B layer of the coextruded stretch wrap of the present invention is preferably fabricated from a low density polyethylene (LDPE) resin. This material will have a density ranging from about 0.905 to about 0.940 gm/cc and have a melt index ranging from about 1–7. The cling side of the A-B film can contain any known cling agent uniformly dispersed therein to an extent effective to remain in cling contact with layer B while both are in the stretched condition. Examples of cling additives include, for example, polyisobutylene, having a number average molecular weight in the range of from about 1,000–3,000 grams per mole as measured by a vapor phase osmometry. Other examples are amorphous atactic polypropylenes, e.g. number average M.W. of 2000 and the polyterpenes. The cling additive can be present in the A layer in a concentration of from about 0.5 to about 10 pounds per 100 pounds of resin.

The anti-cling additive present in the B layer of the subject coextrudate can be any effective antiblock capable of converting the B layer to an anti-cling film. Examples of effective materials are crystalline and amorphous silicas, a synthetic sodium aluminum silicate, e.g. $Na_2O.Al_2O_3.SiO_2.4H_2O$, diatomaceous earth, talc and the like, having, a particle size range of from about 0.5 to about 20 microns. These agents can be present in the B layer in a concentration of from about 500 to about 20,000 ppm, preferably from 2500 to 10,000 ppm. In forming the A-B layer coextrudate the A layer is preferably between 10% and 90% of the overall film thickness and the B layer is between about 90 and 10% of the overall film thickness. Preferably the A thickness is 70%–90% of the total thickness.

In preparing the cling and noncling layers, it is contemplated to include therebetween any intermediate layer sufficient to prevent additive migration in either direction. For example, this layer can be a layer of A without cling additive or a layer of B without anticling material or any other barrier type thermoplastic resin. Further, as indicated above, the invention contemplates a multilayer film with layers of other functions between layers A and B.

In preparing the A/B extrudate of the present invention, any known prior art technique for coextruding the same can be employed. For example, the A formulation containing the appropriate amount of cling additive can be fed into the feed hopper of a conventional rotating screw extruder. The extruder screw employed can have a 6 inch diameter and a length to diameter ratio of about 24:1. A satellite extruder is employed for the extrusion of the B composition containing the appropriate amount of anti-cling agent. The satellite extruder comprises a conventional extruder having an extruder screw with a 3.5 inch diameter and a length to diameter ratio of about 24:1. Molten resin from the satellite extruder is fed into the cast film die affixed to the end of the A extuder through an adaptor specifically designed to join the B polymer stream from the satellite extruder to the molten A polymer stream so that it effectively interfaces with the molten surface of the A layer. A more complete description of this prior art process may be found in U.S. Pat. No. 3,748,962, the disclosure of which is incorporated herein by reference.

EXAMPLE 1

Employing the above described technique, an A/B coextrusion was formed composed of an 80% A layer thickness of a 3.0 M.I., 0.917 gm/c.c. density LLDPE containing polyisobutylene (number average M.W. 2060) in the ratio of 3 parts per 100 parts of LLDPE and a 20% B layer thickness of LDPE having a 2.0 M.I. of a 0.920 gm/c.c. density containing 5,000 PPM of a synthetic sodium aluminum silicate of the approximate formula $Na_2O. Al_2O_3.2SiO_2.4H_2O$. The size of aggregates (Din 51 033) was 3–4 microns. The slot coextruded film had a gauge of 0.9 mils.

The resulting film had a cling force of 290 grams, cling surface to noncling surface. This respresents an excellent cling force. Industry stretch wrap ranges from 70 grams for a no-tack stretch film to 500 for a stretch film with tackifier throughout. The resulting film also had a coefficient of friction, (dynamic) noncling layer to noncling layer of 0.8. This indicates there is no cling force and there is a slide property when the noncling surfaces are in contact with relative motion therebetween.

EXAMPLE 2

A second A/B layer stretch film was a coextruded combination of a 90% A layer thickness having a 2.4 M.I., 0.917gm/c.c. density LLDPE containing 2.4 parts per 100 parts of resin of polyisobutylene (number average M.W. 1300) and a 10% B layer thickness of a low density polyethylene having a 2.0 M.I., 0.920gm/c.c. density resin containing 10,000 ppm amorphous silica having a particle size of 5–15 microns. The slot extruded film had a gauge of about 0.9 mils.

This film had good A to B surface cling and no appreciable cling B to B.

Both films showed excellent stretch wrap characteristics in stabilizing loose loads and in addition the entire contacting surfaces remained in stretch wrap contact due to the cling of the outer A surface to the outer B surface. There is no cling between test contacted B surfaces. This permits effective and non-cling contact between wrapped adjacent loads.

Although the examples described a cast film process for the manufacture of the present stretch film products, it will be understood that other conventional thermoplastic film forming techniques for the preparation of stretch wrap may be employed, such as, tubular extrusion utilizing an entrapped air bubble to expand the extruded film tube. The stretch wrap film of the present invention should have a minimum stretch capability of 90% and typically will have a maximum stretch of about 300–400%.

It is to be understood that the foregoing description is merely illustrative of preferred embodiments of the invention, of which many variations may be made by those skilled in the art within the scope of the following claims without departing from the spirit thereof.

What is claimed is:

1. A stretch wrap film having one-sided cling comprising a transparent thermoplastic A/B film structure wherein layer A, in its stretched condition, has a comparatively high cling force to layer B and layer B has at least substantially no cling force to a layer of itself and has a slide property when layer B is in contact with a layer of itself with relative motion therebetween.

2. The film of claim 1 wherein layer A contains a cling additive dispersed therein, said cling additive being of a character and in an amount sufficient to maintain film A, in its stretched condition, in cling-contact with layer B, and wherein layer B contains an anti-cling additive of a character and an amount sufficient prevent at least any substantial cling force to a layer of itself.

3. The film of claim 2 wherein layers A and B are polyolefins.

4. The film of claim 3 wherein layers A and B are generically polyethylene.

5. The film of claim 4 wherein layer A comprises a linear low density polyethylene, said linear low density polyethylene consisting essentially of ethylene co-polymerized with a minor amount of at least one alpha-olefin having 4 to 10 carbon atoms and wherein layer B is a low density polyethylene.

6. The film of claim 5 wherein said linear low density polyethylene has a density of from about 0.905 to about 0.940 gm/c.c. and a melt index of about 1–6 and said low density polyethylene has a density of about 0.905 to about 0.940 gm/c.c. and a melt index of between about 1 and 7.

7. The film of claim 6 wherein said linear low density polyethylene has been formed by copolymerization of ethylene with from about 1–10% by weight of a member selected from the group consisting of butene-1;3-methyl-butene-1;3-methyl-pentene-1;4-methyl-pentene-1; 3-methyl-hexene-1; octene-1; decene-1 and mixtures thereof.

8. The film of claim 7 wherein said cling additive is a member selected from the group consisting of an amorphorous polypropylene, polyisobutylene, ethylene vinyl acetate, and a polyterpene.

9. The film of claim 7 wherein said anti-cling additive is a member selected from the group consisting of a highly subdivided silica and a silicate.

10. The film of claim 7 wherein said cling additive is a polyisobutylene and said anti-cling additive is a highly subdivided synthetic sodium aluminum silicate.

* * * * *

REEXAMINATION CERTIFICATE (1363rd)
United States Patent [19]
Eichbauer et al.

[11] B1 4,518,654
[45] Certificate Issued  Oct. 2, 1990

[54] ONE-SIDED CLING STRETCH WRAP

[75] Inventors: George N. Eichbauer, Fairport; Beth A. LeBlanc, Rochester, both of N.Y.

[73] Assignee: Mobil Oil Corporation, N.Y.

Reexamination Request:
No. 90/001,898, Oct. 2, 1990

Reexamination Certificate for:
Patent No.: 4,518,654
Issued: May 21, 1985
Appl. No.: 564,664
Filed: Dec. 23, 1983

[51] Int. Cl.$^5$ .................. B32B 27/06; B32B 27/32
[52] U.S. Cl. .................... 428/331; 428/516; 428/519; 428/520; 428/689; 428/913; 53/211; 53/441; 53/556; 53/587; 264/171; 242/159
[58] Field of Search .............. 428/331, 516, 520, 913, 428/519

[56] References Cited
U.S. PATENT DOCUMENTS

| | | |
|---|---|---|
| 3,088,848 | 5/1963 | Tritsch . |
| 3,142,377 | 7/1964 | Lulla et al. ............... 206/59 |
| 3,252,833 | 5/1966 | Skobel . |
| 3,265,769 | 8/1966 | Schaffhausen ............ 260/889 |
| 3,372,049 | 3/1968 | Schaffhausen ............ 117/7 |
| 3,491,877 | 1/1970 | Viker et al. . |
| 3,732,122 | 5/1973 | Fehrn-Christensen ........ 117/122 |
| 4,024,312 | 5/1977 | Korpman ................. 428/343 |
| 4,379,197 | 4/1983 | Cipriani ................. 428/220 |
| 4,397,905 | 8/1983 | Dettmer et al. ........... 428/180 |
| 4,414,261 | 11/1983 | Nanbu .................. 428/213 |
| 4,451,533 | 5/1984 | Wong et al. ............. 428/337 |

OTHER PUBLICATIONS

AB Celloplast, Ltd., "Teno Spin—Wrap Palletized goods in stretch-film . . . ", Nov. 1980, p. 34, Nord-Emballage.

AB Celloplast, Ltd., "Teno Spin—Cost of Film, The Controllable Cost", Dec. 1981, p. 21, Nord-Emballage.

AB Celloplast, Ltd., "On the Lookout for Tricky Problems", 1981, pp. 10-11, Nord-Emballage/Special Edition for Interpack.

*Primary Examiner*—P. C. Sluby

[57] ABSTRACT

A stretch wrap film having one sided cling comprising a thermoplastic A/B film structure wherein layer A in stretched condition has a comparatively high cling force to layer B and layer B has at least substantially no cling force to a layer of itself.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 through 10 is confirmed.

New claims 11 through 22 are added and determined to be patentable.

*11. A stretch wrap film having a stretch capability of at least 90% and having one-sided cling comprising a transparent thermoplastic A/B film structure wherein layer A, in its stretched condition, has a comparatively high cling force to layer B and layer B has at least substantially no cling force to a layer of itself and has a slide property when layer B is in contact with a layer of itself with relative motion therebetween, wherein layer B contains an anti-cling additive selected from the group consisting of highly subdivided silica and a silicate, said additive being present in sufficient amount in layer B to prevent at least any substantial cling force to itself and to permit said slide property without substantially affecting stretch of said film.*

*12. The film of claim 11 wherein at least one layer of said film is formed from linear low density polyethylene.*

*13. The film of claim 12 wherein the linear low density polyethylene layer is an intermediate layer between layers A and B.*

*14. The film of claim 12 or 13 wherein the linear low density polyethylene consists essentially of ethylene copolymerized with a minor amount of at least one alpha-olefin having 4 to 10 carbon atoms.*

*15. The film of claim 11 wherein layer A contains a cling additive dispersed therein, said cling additive being of a character and in an amount sufficient to maintain film A, in its stretched condition, in cling contact with layer B.*

*16. The film of claims 11, 12, 13, or 15 wherein layers A and B are polyolefins.*

*17. The film of claims 11, 12, 13, or 15 wherein layers A and B are generically polyethylene.*

*18. The film of claims 12 or 13 wherein said linear low density polyethylene has a density of from about 0.905 to about 0.940 gm/c.c. and a melt index of about 1-6 and layer B is low density polyethylene having a density of about 0.905 to about 0.940 gm/c.c and a melt index of between about 1 and 7.*

*19. The film of claims 12 or 13 wherein said linear low density polyethylene has been formed by copolymerization of ethylene with from about 1-10% by weight of a member selected from the group consisting of butene-1; 2-methyl-butene-1; 3-methyl-pentene-1; 4-methyl-pentene-1; 3-methyl-hexene-1; octene-1; decene-1 and mixtures thereof.*

*20. The film of claim 15 wherein said cling additive is a member selected from the group consisting of an amorphous polypropylene, polyisobutylene, ethylene vinyl acetate, and a polyterpene.*

*21. The film of claims 11, 12 or 15 wherein layer A is ethylene vinyl acetate, layer B is low density polyethylene and the intermediate layer is linear low density polyethylene.*

*22. The film of claims 11, 12, 13, 15 or 20 wherein said anti-cling additive is a highly subdivided synthetic sodium aluminum silicate.*

* * * * *